United States Patent
Wang et al.

(10) Patent No.: US 10,307,720 B2
(45) Date of Patent: Jun. 4, 2019

(54) INTERMEDIATE MEDIUM HEAT EXCHANGING DEVICE FOR SUPERCRITICAL WATER OXIDATION SYSTEM

(71) Applicant: XI'AN JIAOTONG UNIVERSITY, Xi'an, Shaanxi (CN)

(72) Inventors: Shuzhong Wang, Shaanxi (CN); Mengmeng Ren, Shaanxi (CN); Xingying Tang, Shaanxi (CN); Jie Zhang, Shaanxi (CN); Yuzhen Wang, Shaanxi (CN); Yanhui Li, Shaanxi (CN)

(73) Assignee: XI'AN JIAOTONG UNIVERSITY, Xi'an, Shaanxi (CN)

( * ) Notice: Subject to any disclaimer, the term of this patent is extended or adjusted under 35 U.S.C. 154(b) by 75 days.

(21) Appl. No.: 15/611,755

(22) Filed: Jun. 1, 2017

(65) Prior Publication Data
US 2017/0266613 A1    Sep. 21, 2017

(51) Int. Cl.
*B01J 3/00*    (2006.01)
*B01J 19/02*    (2006.01)
*B01J 19/24*    (2006.01)

(52) U.S. Cl.
CPC .............. *B01J 3/008* (2013.01); *B01J 19/02* (2013.01); *B01J 19/24* (2013.01);
(Continued)

(58) Field of Classification Search
None
See application file for complete search history.

(56) References Cited

U.S. PATENT DOCUMENTS 5,252,224 A * 10/1993 Modell ................ B01D 29/117
                                                             210/695
5,560,823 A * 10/1996 Whiting .................. B01J 3/008
                                                             210/175

FOREIGN PATENT DOCUMENTS

CN    105600914 A  *  5/2016
CN    105627814 A  *  6/2016
(Continued)

OTHER PUBLICATIONS

English abstract and machine translation for CN 105600914 A, retrieved on Oct. 11, 2018. (Year: 2018).*
(Continued)

*Primary Examiner* — Jennifer A Leung

(57) ABSTRACT

An intermediate medium heat exchanging device for a supercritical water oxidation system includes a material main loop, an intermediate medium loop and a replenishment branch. A material pump, a preheater, a spray desuperheater, a reactor and a regenerator are connected in sequence to form the material main loop; a buffer tank, a circulating pump, the regenerator, the preheater and a water cooler form the intermediate medium loop. A back pressure valve is located above the buffer tank. The replenishment branch includes a cooling water pump, an outlet of the cooling water pump is divided into two sub-branches, one sub-branch is connected with the spray desuperheater, and another sub-branch is connected with the buffer tank. The intermediate medium heat exchanging device is reasonable in structural design, and is able to maximumlly reduce the investment cost and ensure the stable operation of the system.

20 Claims, 1 Drawing Sheet

(52) U.S. Cl.
CPC ............. *B01J 2219/00054* (2013.01); *B01J 2219/00103* (2013.01); *Y02P 20/544* (2015.11)

(56) References Cited

FOREIGN PATENT DOCUMENTS

| | | | |
|---|---|---|---|
| CN | 105776492 A | * | 7/2016 |
| JP | 07275872 A | * | 10/1995 |
| JP | 10328699 A | * | 12/1998 |

OTHER PUBLICATIONS

English abstract and machine translation for CN 105627814 A, retrieved on Oct. 11, 2018. (Year: 2018).*

* cited by examiner

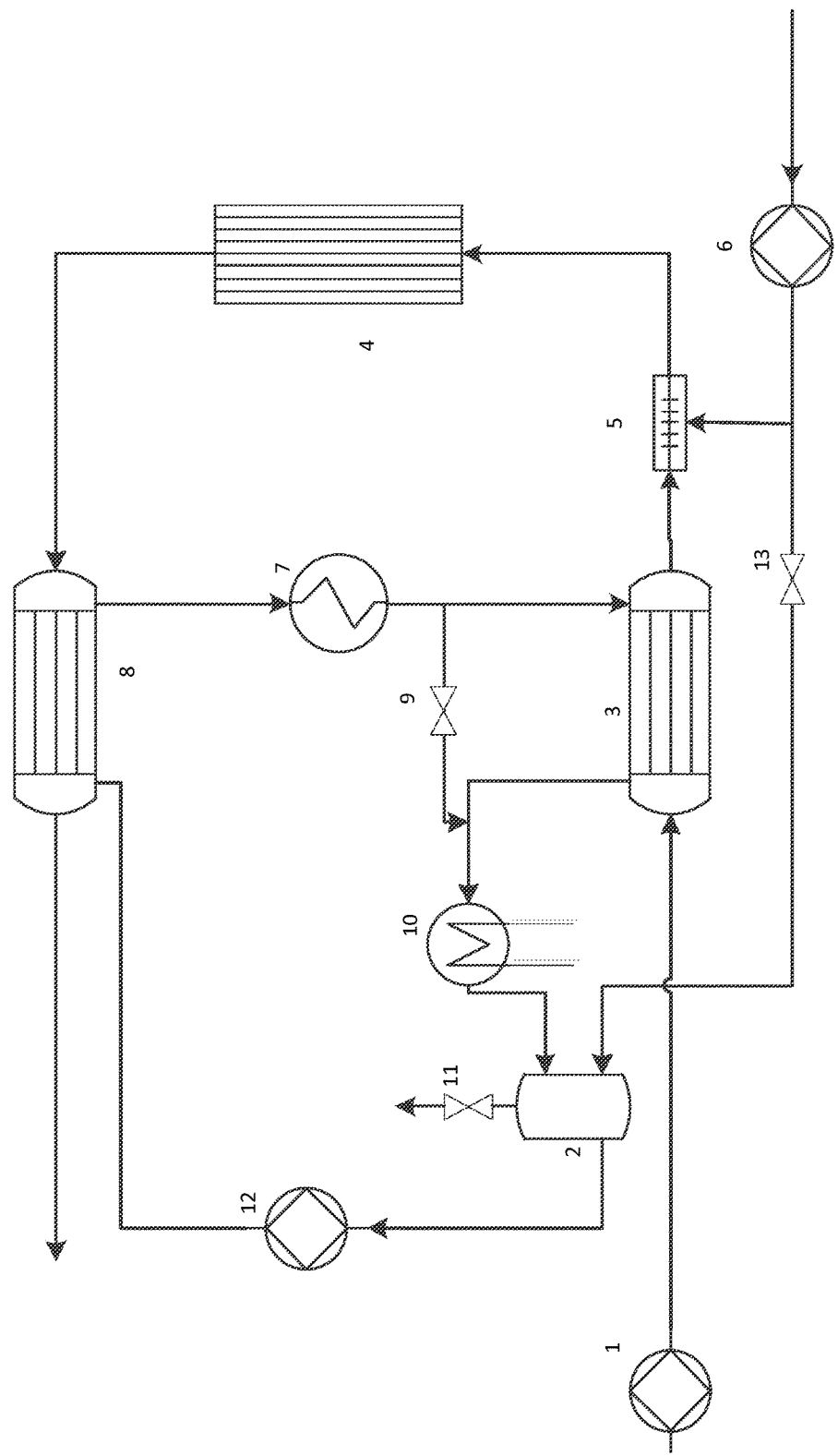

INTERMEDIATE MEDIUM HEAT EXCHANGING DEVICE FOR SUPERCRITICAL WATER OXIDATION SYSTEM

BACKGROUND OF THE PRESENT INVENTION

Field of Invention

The present invention belongs to the field of environmental protection and chemical technology, and more particularly to an intermediate medium heat exchanging device for a supercritical water oxidation system.

Description of Related Arts

The SCWO (supercritical water oxidation) technology utilizes special properties of the supercritical water (T>374.15° C., P>22.1 MPa) between liquid and gas, that is, the supercritical water is approximate to nonpolar organic solvents in the dielectric constant, has a high diffusion coefficient and a low viscosity, and is able to be completely miscible with most organic matters, oxygen, carbon dioxide and other non-polar molecules, so that refractory organic matters are able to produce the rapid and complete homogeneous oxidation reaction in the supercritical water. Therefore, it is defined as the most promising wastewater treatment technology in one of six major areas of the US national key technology, that is, "Energy and Environment".

In the supercritical water oxidation reaction, the materials need to be pressurized and heated to the supercritical state, so it is necessary to consume a lot of energy; and, the supercritical water oxidation reaction itself is an exothermic reaction, the fluid temperature after the reaction is higher than the preheating temperature, so that the materials are heated through the fluid after the reaction to effectively reduce the operating cost of the system. However, due to the materials before and after the reaction generally have strong corrosivity, the heat exchanger, for directly exchanging heat, needs expensive corrosion-resistant materials and thick corrosion allowances, which leads to extremely high heat exchanger investment. Moreover, reaction exothermic fluctuations and heat exchanger efficiency fluctuations will lead to insufficient or excessive material preheating. Therefore, it is necessary to construct an intermediate medium heat exchanging device for a supercritical water oxidation system, which is able to reduce the operating cost and the investment cost at the same time and operate reliably.

SUMMARY OF THE PRESENT INVENTION

An object of the present invention is to provide an intermediate medium heat exchanging device for a supercritical water oxidation system, which is reasonable in structural design and reliable in operation, and is able to maximumlly utilize the heat of the fluid after the reaction and reduce the operating cost.

The present invention is achieved by technical solutions as follows.

The present invention discloses an intermediate medium heat exchanging device for a supercritical water oxidation system, which comprises a material main loop and an intermediate medium loop, wherein:

a material pump, a preheater, a spray desuperheater, a reactor and a regenerator are connected in sequence to form the material main loop; a buffer tank, a circulating pump, the regenerator, the preheater and a water cooler form the intermediate medium loop; both the preheater and the regenerator are double-pipe heat exchangers;

the material pump is connected with an inner pipe inlet of the preheater, an inner pipe outlet of the preheater is connected with the spray desuperheater, the reactor is connected with an inner pipe inlet of the regenerator; the buffer tank is connected with an outer pipe inlet of the regenerator through the circulating pump, an outer pipe outlet of the regenerator is communicated with an outer pipe inlet of the preheater, an outer pipe outlet of the preheater is connected with the buffer tank through the water cooler; a back pressure valve is located above the buffer tank;

the intermediate medium heat exchanging device further comprises a replenishment branch, wherein the replenishment branch comprises a cooling water pump, an outlet of the cooling water pump is divided into two sub-branches, one sub-branch is connected with the spray desuperheater, another sub-branch is connected with the buffer tank.

The intermediate medium loop further comprises a heater, wherein the regenerator is connected with the preheater through the heater.

An outlet of the heater is communicated with an inlet of the water cooler through a high-temperature shunting branch; and the high-temperature shunting branch comprises a first regulating valve.

The heater is an electromagnetic heater or a conductive heater.

The sub-branch, which connects the cooling water pump with the buffer tank, comprises a second regulating valve.

A fluid in an inner pipe of the preheater and the regenerator is a material to be treated, and a fluid in an outer pipe thereof is an intermediate medium.

The intermediate medium is water, heat transfer oil or molten salt; when the intermediate medium is water, a pressure of the inner pipe outlet of the regenerator is higher than that of the outer pipe inlet thereof.

The outer pipe of the preheater and the regenerator is made from low alloy stainless steel, the inner pipe thereof is made from high-temperature nickel base alloy materials and the materials are subdivided and selected according to temperature ranges.

Compared with the prior art, the present invention has beneficially technical effects as follows.

In an intermediate medium heat exchanging device for a supercritical water oxidation system, provided by the present invention, a material pump, a preheater, a spray desuperheater, a reactor and a regenerator are connected in sequence to form a material main loop; a buffer tank, a circulating pump, the regenerator, the preheater and a water cooler form an intermediate medium loop. The intermediate medium transfers the heat of the fluid after the supercritical water oxidation reaction to the material before the reaction, preheats the material through the heat of the fluid after the supercritical water oxidation reaction, the pressure of the intermediate medium is maintained by the back pressure valve located above the buffer tank and the cooling water pump of the replenishment branch, so as to maximumlly utilize the heat of the fluid after the reaction. The heat exchanging device provided by the present invention is reasonable in structural design, and is able to maximumlly reduce the investment cost of the system and ensure the stable operation of the system.

Further, the intermediate medium loop comprises the heater for heating when the heater is started and heat replenishing when the heater is normally operated, which is high in heating efficiency, good in safety and reliability, and excellent in adjusting sensitivity relatively to a mode of directly heating the material.

Further, the electromagnetic or conductive heater is adopted for increasing the temperature when the heater is started and replenishing the heat when the heater is normally operated, which is sensitive to load adjustment, small in system fluctuation and high in stability relatively to a heating mode through a gas stove.

Further, the fluid in the outer pipe of the double-pipe heat exchanger is the intermediate medium which can be water, the outer pipe is made from relatively cheap low alloy stainless steel, so that the investment cost of the heat exchanger can be reduced about 40% relatively to the mode of directly heat exchanging.

These and other objectives, features, and advantages of the present invention will become apparent from the following detailed description, the accompanying drawings, and the appended claims.

BRIEF DESCRIPTION OF THE DRAWINGS

The drawing is a structurally schematic view of an intermediate medium heat exchanging device for a supercritical water oxidation system according to a preferred embodiment of the present invention.

In the drawing, 1: material pump; 2: buffer tank; 3: preheater; 4: reactor; 5: spray desuperheater; 6: cooling water pump; 7: heater; 8: regenerator; 9: first regulating valve; 10: water cooler; 11: back pressure valve; 12: circulating pump; 13: second regulating valve.

DETAILED DESCRIPTION OF THE PREFERRED EMBODIMENT

The present invention is further described in detail with specific embodiments as follows, which is intended to be explanation but not intended to be limiting.

Referring to the drawing, an intermediate medium heat exchanging device for a supercritical water oxidation system according to a preferred embodiment of the present invention is illustrated, comprising: a material pump 1, a buffer tank 2, a preheater 3, a reactor 4, a spray desuperheater 5, a cooling water pump 6, a heater 7, a regenerator 8, a first regulating valve 9, a water cooler 10, a back pressure valve 11, a circulating pump 12, and a second regulating valve 13. The material pump 1, the preheater 3, the spray desuperheater 5, the reactor 4 and the regenerator 8 are connected in sequence to form a material main loop; the buffer tank 2, the circulating pump 12, the regenerator 8, the preheater 3 and the water cooler 10 form an intermediate medium loop; an outlet of the heater 7 is communicated with an inlet of the water cooler 10 through the first regulating valve 9; the back pressure valve 11 is located above a top of the buffer tank 2; an outlet of the cooling water pump 6 is connected with the spray desuperheater 5, and simultaneously is connected with the buffer tank 2 through the second regulating valve 13. The material pump 1 is connected with an inner pipe inlet of the preheater 3, an inner pipe outlet of the preheater 3 is connected with the spray desuperheater 5, the reactor 4 is connected with an inner pipe inlet of the regenerator 8; the buffer tank 2 is connected with an outer pipe inlet of the regenerator 8 through the circulating pump 12, an outer pipe outlet of the regenerator 8 is communicated with an outer pipe inlet of the preheater 3, an outer pipe outlet of the preheater 3 is connected with the buffer tank 2 through the water cooler 10.

Both the preheater 3 and the regenerator 8 are double-pipe heat exchangers, a fluid in an inner pipe of each of the heat exchangers is a prepared material to be treated, a fluid in an outer pipe thereof is intermediate medium high-pressure water; the outer pipe is made from low alloy stainless steel, the inner pipe is made from high-temperature nickel base alloy materials and the materials are subdivided and selected according to temperature ranges. A cold source of the water cooler 10 is external cooling water, the inlet of the water cooler 10 is communicated the outlet of the heater 7 through a high-temperature shunting branch; the heater 7 adopts an electromagnetic heating or conductive heating mode. The back pressure valve 11 is located above the buffer tank 2, and the buffer tank 2 is connected with the outlet of the cooling water pump 6 through the second regulating valve 13.

To further understand the present invention, the working principle thereof is illustrated as follows.

In the concrete implementation, the prepared material enters the preheater 3 through the material pump 1 for being preheated to a required preheating temperature, and then enters the reactor 4 for reaction, a certain amount of heat are released during the reaction, a fluid after the reaction flows into the regenerator 8 for transferring the heat to the intermediate medium, and simultaneously is cooled to enter a follow-up process. An intermediate medium, from a beginning of the buffer tank 2, under an action of the circulating pump 12, firstly absorbs the heat of the fluid after the reaction through the regenerator 8, and then flows through the heater 7 which is started if necessary to further increase a temperature of the intermediate medium, and then enters the preheater 3 for transferring the heat to the material.

In the supercritical water oxidation system, the material before and after the reaction is the supercritical pressure fluid, there is a large specific heat region near the critical point. In order to match enthalpy temperature variation characteristics of the supercritical fluid, a pressure of the intermediate medium should be higher than that of the fluid after the reaction, a pressure of the intermediate medium loop is maintained by the back pressure valve on the top of the buffer tank and a replenishment branch which connects the cooling water pump to the buffer tank.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An intermediate medium heat exchanging device for a supercritical water oxidation system, which comprises: a material main loop and an intermediate medium loop, wherein:

a material pump (1), a preheater (3), a spray desuperheater (5), a reactor (4) and a regenerator (8) are connected in sequence to form the material main loop; a buffer tank (2), a circulating pump (12), the regenerator (8), the preheater (3) and a water cooler (10) form the intermediate medium loop;

the material pump (1) is connected with an inner pipe inlet of the preheater (3), an inner pipe outlet of the preheater (3) is connected with the spray desuperheater (5), the reactor (4) is connected with an inner pipe inlet of the regenerator (8); the buffer tank (2) is connected with an outer pipe inlet of the regenerator (8) through the circulating pump (12), an outer pipe outlet of the regenerator (8) is communicated with an outer pipe inlet of the preheater (3), an outer pipe outlet of the preheater (3) is connected with the buffer tank (2) through the water cooler (10); a back pressure valve (11) is located above the buffer tank (2);

the intermediate medium heat exchanging device further comprises a replenishment branch, the replenishment branch comprises a cooling water pump (6), an outlet of the cooling water pump (6) is divided into two sub-branches, one sub-branch is connected with the spray desuperheater (5); another sub-branch is connected with the buffer tank (2).

2. The intermediate medium heat exchanging device for the supercritical water oxidation system, as recited in claim 1; wherein the intermediate medium loop further comprises a heater (7), the regenerator (8) is connected with the preheater (3) through the heater (7).

3. The intermediate medium heat exchanging device for the supercritical water oxidation system, as recited in claim 2, wherein an outlet of the heater (7) is communicated with an inlet of the water cooler (10) through a high-temperature shunting branch; and the high-temperature shunting branch comprises a first regulating valve (9).

4. The intermediate medium heat exchanging device for the supercritical water oxidation system, as recited in claim 2, wherein the heater is an electromagnetic heater or conductive heater.

5. The intermediate medium heat exchanging device for the supercritical water oxidation system, as recited in claim 1, wherein the sub-branch, which connects the cooling water pump (6) with the buffer tank (2), comprises a second regulating valve (13).

6. The intermediate medium heat exchanging device for the supercritical water oxidation system, as recited in claim 1, wherein both the preheater (3) and the regenerator (8) are double-pipe heat exchangers, a fluid in an inner pipe of the preheater (3) and the regenerator (8) is a material to be treated, a fluid in an outer pipe thereof is an intermediate medium.

7. The intermediate medium heat exchanging device for the supercritical water oxidation system as recited in claim 2, wherein both the preheater (3) and the regenerator (8) are double-pipe heat exchangers, a fluid in an inner pipe of the preheater (3) and the regenerator (8) is a material to be treated, a fluid in an outer pipe thereof is an intermediate medium.

8. The intermediate medium heat exchanging device for the supercritical water oxidation system, as recited in claim 3, wherein both the preheater (3) and the regenerator (8) are double-pipe heat exchangers, a fluid in an inner pipe of the preheater (3) and the regenerator (8) is a material to be treated, a fluid in an outer pipe thereof is an intermediate medium.

9. The intermediate medium heat exchanging device for the supercritical water oxidation system as recited in claim 4, wherein both the preheater (3) and the regenerator (8) are double-pipe heat exchangers, a fluid in an inner pipe of the preheater (3) and the regenerator (8) is a material to be treated, a fluid in an outer pipe thereof is an intermediate medium.

10. The intermediate medium heat exchanging device for the supercritical water oxidation system, as recited in claim 5, wherein both the preheater (3) and the regenerator (8) are double-pipe heat exchangers, a fluid in an inner pipe of the preheater (3) and the regenerator (8) is a material to be treated, a fluid in an outer pipe thereof is an intermediate medium.

11. The intermediate medium heat exchanging device for the supercritical water oxidation system, as recited in claim 6, wherein the intermediate medium is water, heat transfer oil or molten salt; when the intermediate medium is water, a pressure of the inner pipe outlet of the regenerator (8) is higher than that of the outer pipe inlet thereof.

12. The intermediate medium heat exchanging device for the supercritical water oxidation system, as recited in claim 7, wherein the intermediate medium is water, heat transfer oil or molten salt; when the intermediate medium is water, a pressure of the inner pipe outlet of the regenerator (8) is higher than that of the outer pipe inlet thereof.

13. The intermediate medium heat exchanging device for the supercritical water oxidation system, as recited in claim 8, wherein the intermediate medium is water, heat transfer oil or molten salt; when the intermediate medium is water, a pressure of the inner pipe outlet of the regenerator (8) is higher than that of the outer pipe inlet thereof.

14. The intermediate medium heat exchanging device for the supercritical water oxidation system, as recited in claim 9, wherein the intermediate medium is water, heat transfer oil or molten salt; when the intermediate medium is water, a pressure of the inner pipe outlet of the regenerator (8) is higher than that of the outer pipe inlet thereof.

15. The intermediate medium heat exchanging device for the supercritical water oxidation system, as recited in claim 10, wherein the intermediate medium is water, heat transfer oil or molten salt; when the intermediate medium is water, a pressure of the inner pipe outlet of the regenerator (8) is higher than that of the outer pipe inlet thereof.

16. The intermediate medium heat exchanging device for the supercritical water oxidation system, as recited in claim 1, wherein an outer pipe of the preheater (3) and the regenerator (8) is made from stainless steel, an inner pipe thereof is made from high-temperature nickel base alloy materials.

17. The intermediate medium heat exchanging device for the supercritical water oxidation system, as recited in claim 2, wherein an outer pipe of the preheater (3) and the regenerator (8) is made from stainless steel, an inner pipe thereof is made from high-temperature nickel base alloy materials.

18. The intermediate medium heat exchanging device for the supercritical water oxidation system, as recited in claim 3, wherein an outer pipe of the preheater (3) and the regenerator (8) is made from stainless steel, an inner pipe thereof is made from high-temperature nickel base alloy materials.

19. The intermediate medium heat exchanging device for the supercritical water oxidation system, as recited in claim 4, wherein an outer pipe of the preheater (3) and the regenerator (8) is made from stainless steel; an inner pipe thereof is made from high-temperature nickel base alloy materials.

20. The intermediate medium heat exchanging device for the supercritical water oxidation system, as recited in claim 5, wherein an outer pipe of the preheater (3) and the regenerator (8) is made from stainless steel, an inner pipe thereof is made from high-temperature nickel base alloy materials.

* * * * *